Patented Aug. 4, 1931

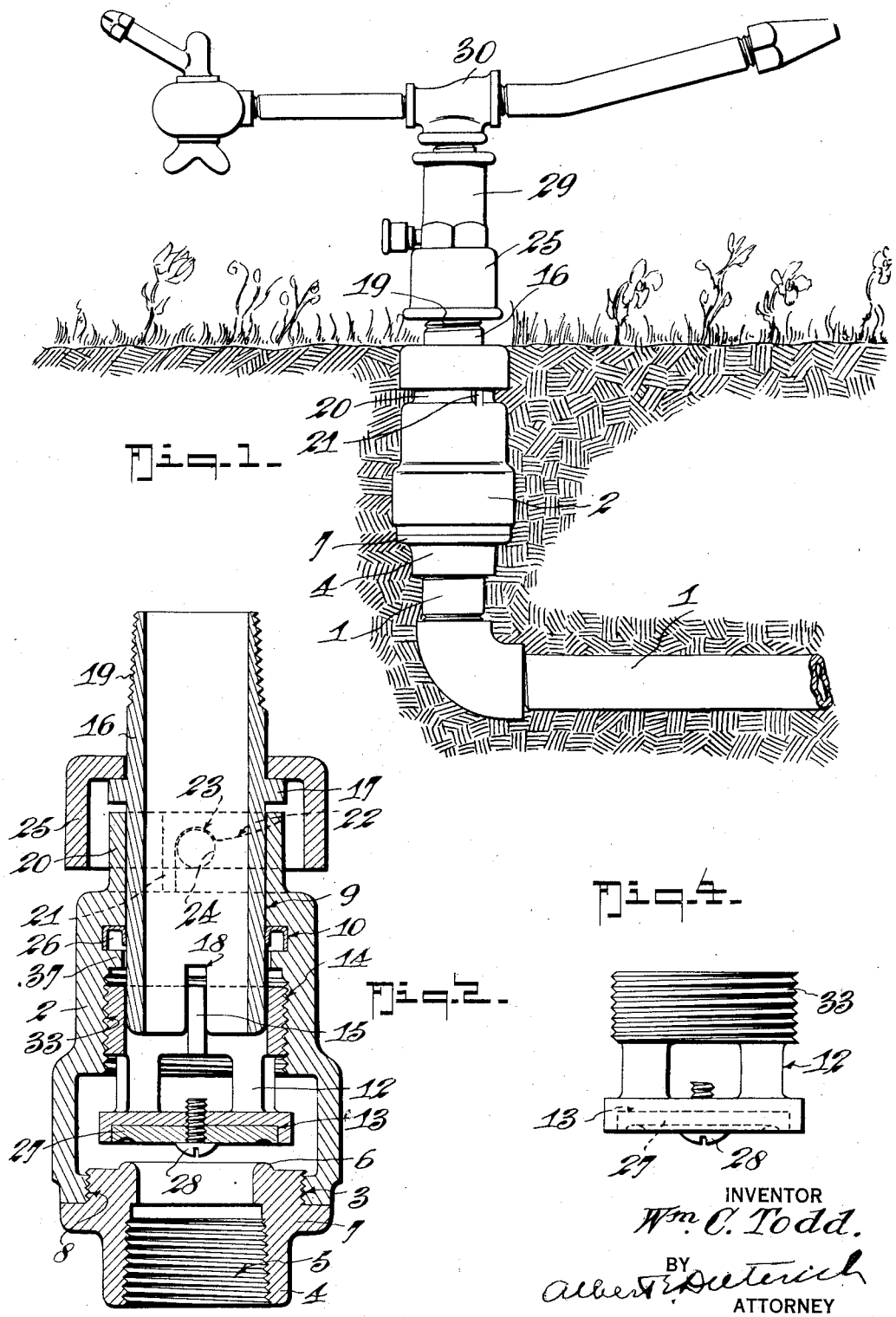

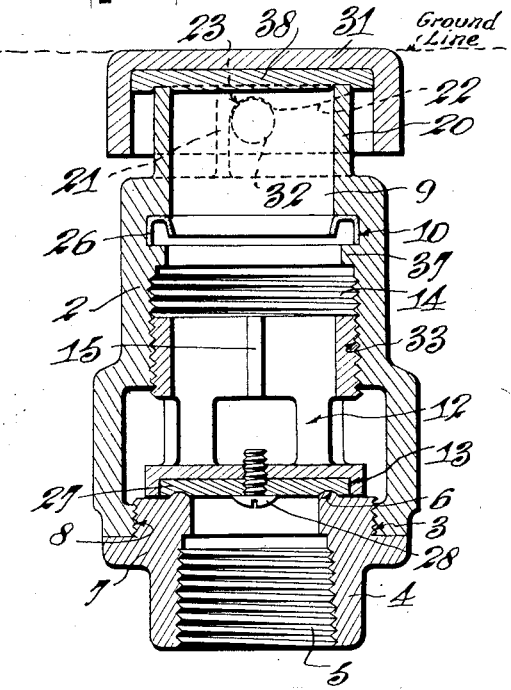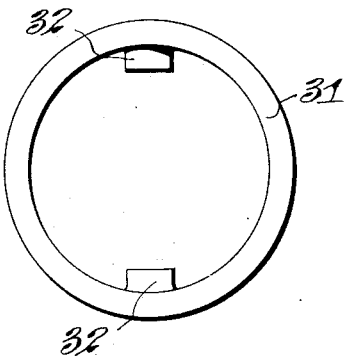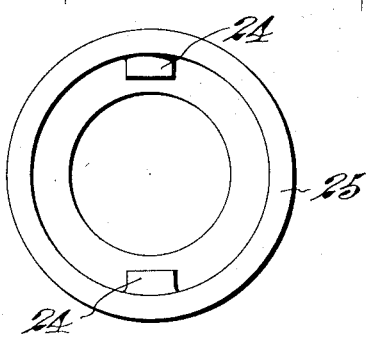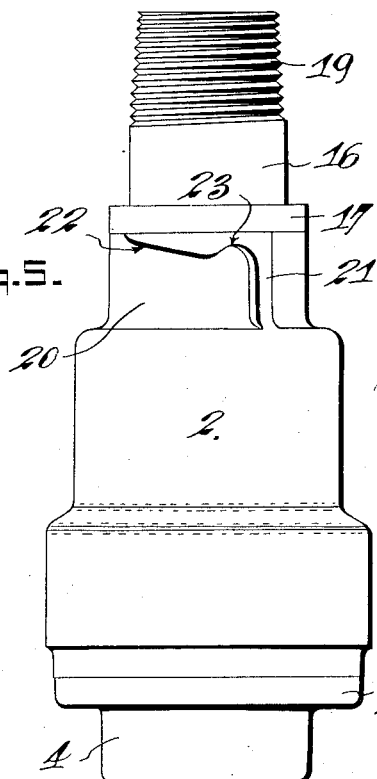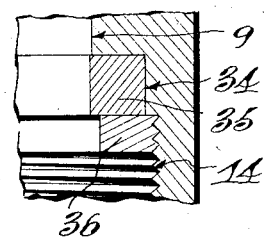

1,817,430

UNITED STATES PATENT OFFICE

WILLIAM CHARLES TODD, OF VICTORIA, BRITISH COLUMBIA, CANADA, ASSIGNOR TO ECONOMY IRRIGATION COMPANY, INC., OF SEATTLE, WASHINGTON, A CORPORATION OF WASHINGTON

QUICK COUPLING VALVE DEVICE

Application filed April 2, 1930. Serial No. 441,115.

My invention relates to valve devices for controlling the flow of fluids through pipes or conduits and while it especially has been designed for use in combination with lawn sprinklers of the general type disclosed in my Patent No. 1,721,237, issued July 16, 1929, it is obviously useful in almost any place where shut-off and control valves are employed, as for instance in oil and gas conduits, hose pipes, steam conduits, etc.

Primarily, the invention has for its object to provide a valve device comprising a casing or body having a valved passageway and enclosing a tubular skeleton valve member having a washer or disk to engage the valve seat, and a quill, together with a quick-acting coupling nut for operating the valve member and conducting the fluid from the valve outwardly.

Further, it is an object to provide a device of the character specified which is particularly useful in connection with sprinkler heads or hoseless sprinkling systems for the irrigation of golf courses or any large areas.

Further, it is an object to provide a valve device that may be screwed onto the piping system below the ground level and when capped it will be strong enough to bear the weight of a tractor or lawn mower as the same passes thereover.

Further, it is an object to provide a device by the employment of which it will be possible to turn on the full stream of water (or less if desired), a thing that does not seem possible with the snap valves and couplings at present on the market as they only appear to allow about one-half of the water to pass for which the opening is theoretically designed.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of my invention in use with a lawn sprinkler head attached.

Figure 2 is an enlarged vertical longitudinal section of the device, the quill being in place and the valved passage being open.

Figure 3 is a similar view with the valved passage closed and the cap in place.

Figure 4 is a side elevation of the tubular skeleton valve member.

Figure 5 is a detail side elevation of the valve housing body with the cap (and coupling nut) removed, and with the quill in place.

Figure 6 is a detail inverted plan of the cap.

Figure 7 is a detail inverted plan of the coupling member.

Figure 8 is an enlarged detail view of a slight modification of the invention.

In the drawings in which like numerals of reference indicate like parts in all of the figures, 1 is the under-ground pipe system with which my present invention is particularly adapted to cooperate. The body of the valve housing 2 is internally threaded at its lower end as at 3 to receive the combined seat and base coupling member 4, the latter having a pipe tapped thread 5 by means of which it is secured to the piping system 1.

The member 4 is also provided with a flange 7 and an external thread 8 to cooperate with the internal thread 3. Further the member 4 is provided with a valve seat 6 to cooperate with the washer 27 that is held in the recessed disk end 13 of the tubular skeleton valve 12.

The body 2 has a quill receiving bore 9 and a gasket groove or recess 10 as well as a threaded counterbore 14. The valve 12 is externally threaded as at 33 to cooperate with the threads of the counterbore 14 of the body so as to hold the valve in a seated or unseated position accordingly as it is turned in one direction or the other. A suitable gasket 26 is located in the groove 10.

A quill 16 is provided to fit the bore 9 and it has a slotted end 18 to receive the lugs 15 of the valve member so that by turning the quill 16 the valve member may be moved to the seated or unseated position accordingly as the quill 16 is turned in one direction or the other. The quill 16 has a flange 17 to rest against the end of the neck of the body 2 and it is held in place by a coupling member 25, the latter having circular internal lugs 24 to cooperate with inverted external L lugs 21 on the neck 20 of the body 2. The lugs 21 have inclined fore parts 22 and under cut or recessed portions 23, the latter being adapted to receive the lugs 24 at times to hold the coupling member 25 against becoming uncoupled accidentally.

The washer 27 is removably held in place by a retaining screw 28, the parts being so designed that by disconnecting the members 2 and 4 a new washer 27 may be substituted without taking the valve out of the housing.

29 designates a sprinkler head and 30 a rotating sprinkler of the general type disclosed in my patent aforesaid, the sprinkler head being threaded onto the threaded end 19 of the quill.

Instead of providing the body 2 with a groove or recess 10, it may be simply counterbored as at 34 to an intermediate diameter between that of the bore 9 and that of the threaded bore 14 so as to receive a compressible gasket 35 which may be held in place by a removable threaded ring 36 as indicated in Figure 8 of the drawings.

In the form shown in Figures 1 to 7 of the drawings the ring 37, corresponding to the ring 36, is integrally formed with the body 2.

31 designates a cap having lugs 32 similar to the lugs 24 and cooperating with the lugs 21 in the same manner except that in order to hold the lugs 32 in the recesses 23 the cap 30 may be provided with a rubber gasket or washer 38 so that when the cap is turned to bring the lugs 32 in alignment with the recesses 23 they will spring over the inclines 22 and snap into the recesses 23 where they will be held by the flexibility of the washer 38 against accidental displacement.

It will be seen that with my present apparatus when it is desired to couple a sprinkler to the piping system it is only necessary to remove the cap 31, insert the quill 16 until the flange 17 rests on the neck and the coupling member 25 lies in position over the neck. Then when the quill 16 is turned in a direction to unscrew or open the valve 12, this turning movement, due to the weight of the member 25 on the flange 17, will carry the member 25 with the flange until the lugs 24 lie beneath the recesses 23. Further turning movement of the quill 16 is not imparted to the member 25 because of the lugs 24 engaging the vertical portions of the lugs 21 as stops. As soon, however, as the valve 12 has been lifted from its seat and fluid begins to flow the pressure of the fluid as it meets the resistance of the sprinkler head will cause the quill 16 to rise slightly and thereby lift the coupling member 25 until its lugs 24 enter the recesses 23. The pressure of the flowing fluid therefore holds the lugs 24 and 21 in interlocked position so long as the valve remains open. As soon, however, as the valve is closed (which is accomplished by turning the quill 16 in a reverse direction) the fluid pressure is relieved and the coupling member 25 can be released by turning it back by hand.

From the foregoing description, taken in connection with the accompanying drawings, it is thought that the complete construction, operation and advantages of my invention will be clear to those skilled in the art to which it relates.

What I claim is:

1. In apparatus of the class described, a valve housing body having a passage through the same, a valve seat at the entrant end of said passage, a tubular skeleton valve located within said body and having a screw connection therewith and cooperating with said seat to close said passage, a quill projecting into said body, said quill and said valve having engaging portions, said quill having a flange, and a quick-acting coupling member cooperating with said flange and with said housing body, said coupling member and said body having engaging portions held against disengagement by the pressure of fluid passing through said housing body and said quill when said valve is unseated said quill being free to swivel within the coupling member.

2. In apparatus of the class described, a valve housing having a passage through the same with a valve seat and a valve cooperating with said seat, a quill projecting into said body and constituting a continuation of said passage, said quill having an outer flange, a coupling member fitted over said flange, said coupling member and said body having interlocking lugs so arranged that when said coupling member is turned in one direction said lugs will be brought into cooperative association, and when said coupling member is turned in the reverse direction said lugs will be out of cooperative relation, and means controlled by the pressure of fluid passing through said body and quill for holding said lugs interlocked when said valve is open.

3. In apparatus of the class described, a valve housing body having a passage through the same from end to end, a removable valve seat member secured in one end of said body and having provisions for its attachment to a pipe line, the other end of said body having a neck, said body having a valve chamber, a valve located in said chamber to cooperate with said valve seat member, means to hold said valve seated and unseated accordingly as said valve is moved to one position or another, a valve operating device removably connectible with said valve and projecting through said neck into said body into engagement with said valve, and means removably securing said valve operating device in place while permitting said valve operating device to be turned on its axis to open or close the valve more or less as desired said valve operating device being free to swivel on its axis at all times.

4. In apparatus of the class described, a valve housing body having a passage through the same from end to end, a removable valve seat member secured in one end of said body and having provisions for its attachment to a pipe line, the other end of said body having a neck, said body having a valve chamber, a valve located in said chamber to cooperate with said valve seat member, means to hold said valve seated and unseated accordingly as said valve is moved to one position or another, a valve operating device removably connectible with said valve and projecting through said neck into said body into engagement with said valve, and means removably securing said valve operating device in place, said valve operating device comprising a quill having a flange, a coupling member fitted over said neck to hold said flange thereto, said coupling member and said neck having interlocking lugs adapted to be brought into cooperative position when said valve operating device and said coupling member are turned in a direction to open said valve.

5. In apparatus of the class described, a valve housing body having a passage through the same from end to end, a removable valve seat member secured in one end of said body and having provisions for its attachment to a pipe line, the other end of said body having a neck, said body having a valve chamber, a valve located in said chamber to cooperate with said valve seat member, means to hold said valve seated and unseated accordingly as said valve is moved to one position or another, a valve operating device removably connectible with said valve and projecting through said neck into said body into engagement with said valve, and means removably securing said valve operating device in place, said valve operating device comprising a quill having a flange, a coupling member fitted over said neck to hold said flange thereto, said coupling member and said neck having interlocking lugs adapted to be brought into cooperative position when said valve operating device and said coupling member are turned in a direction to open said valve, and including portions held in locked engagement by the pressure of the fluid passing through said body when the valve is open.

6. In apparatus of the class described, a valve housing body having an inlet end and an outlet end and a passage between said ends including a valve chamber, the inlet end of said body being internally threaded, a member threaded into said inlet end and having a valve seat and provisions for attachment to a fluid conduit, a tubular skeleton valve member in said valve chamber having threaded engagement with said body to serve to close said passage when said valve member is seated on said valve seat, said body at the outlet end having a neck with external lugs, a cupped member fitted over said neck and also having lugs, said lugs adapted to be brought into cooperative association, and means to hold said cupped member in position with said lugs associated and interlocked.

7. In apparatus of the class described, a valve housing body having an inlet end and an outlet end and a passage between said ends including a valve chamber, the inlet end of said body being internally threaded, a member threaded into said inlet end and having a valve seat and provisions for attachment to a fluid conduit, a tubular skeleton valve member in said valve chamber having threaded engagement with said body to serve to close said passage when said valve member is seated on said valve seat, a quill inserted into said body for engaging said valve to seat and unseat the same, said body having a gasket recess, a gasket held in said recess to effect a fluid-tight joint between said quill and said body, and means for retaining said quill in position on said body while permitting rotation of said quill on its axis.

8. In apparatus of the class described, a valve housing body having an inlet end and an outlet end and a passage between said ends including a valve chamber, the inlet end of said body being internally threaded, a member threaded into said inlet end and having a valve seat and provisions for attachment to a fluid conduit, a tubular skeleton valve member in said valve chamber having threaded engagement with said body to serve to close said passage when said valve member is seated on said valve seat, a quill inserted into said body for engaging said valve to seat and unseat the same, said body having a gasket recess, a gasket held in said recess to effect a fluid-tight joint between said quill and said body, and means for retaining said quill in position on said body, said last named means comprising a flange on said quill and a quick-acting coupling member cooperating with said flange and said body and adapted to be held interlocked with said body under the influence of the pressure of the fluid passing through said body and quill when said valve is open said quill being free to swivel on its axis at all times.

WILLIAM CHARLES TODD.